US012411436B2

(12) United States Patent
Hiraike

(10) Patent No.: US 12,411,436 B2
(45) Date of Patent: Sep. 9, 2025

(54) IMAGE FORMING APPARATUS, CONTROL METHOD THEREOF, AND STORAGE MEDIUM

(71) Applicant: CANON KABUSHIKI KAISHA, Tokyo (JP)

(72) Inventor: Kou Hiraike, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 18/478,636

(22) Filed: Sep. 29, 2023

(65) Prior Publication Data

US 2024/0111228 A1 Apr. 4, 2024

(30) Foreign Application Priority Data

Oct. 3, 2022 (JP) ................................ 2022-159257

(51) Int. Cl.
*G03G 15/08* (2006.01)

(52) U.S. Cl.
CPC ................................ *G03G 15/0822* (2013.01)

(58) Field of Classification Search
CPC ........... G03G 15/0806; G03G 15/0808; G03G 15/0813; G03G 15/0822; G03G 15/0863; G03G 21/1878; G03G 21/1882; G03G 21/1885; G03G 21/1889; G03G 2215/0695; G03G 2215/0697; G03G 2221/1823

See application file for complete search history.

(56) References Cited

U.S. PATENT DOCUMENTS

| | | | | |
|---|---|---|---|---|
| 2003/0133719 | A1* | 7/2003 | Tsuruya | G03G 15/553 399/13 |
| 2005/0175240 | A1* | 8/2005 | Parry | G06V 30/1444 705/28 |
| 2019/0086833 | A1* | 3/2019 | Yamada | G03G 15/5008 |
| 2020/0218173 | A1* | 7/2020 | Mochizuki | G03G 15/0865 |

FOREIGN PATENT DOCUMENTS

| | | | |
|---|---|---|---|
| JP | H0524143 | A | 2/1993 |
| JP | H05241436 | A | 9/1993 |
| JP | 2018054862 | A | 4/2018 |

* cited by examiner

*Primary Examiner* — Thomas S Giampaolo, II
(74) *Attorney, Agent, or Firm* — Canon U.S.A., Inc. IP Division

(57) ABSTRACT

An image forming apparatus that performs image formation by rotating a developing device in such a manner that a relative speed of the developing device with respect to a photosensitive drum is set to a first speed, the image forming apparatus includes a setting unit configured to set a predetermined mode in which the relative speed of the developing device with respect to the photosensitive drum is set to a second speed higher than the first speed, a storage unit configured to store, in a recording medium disposed in a toner cartridge containing the toner, information on a number of pages printed in the image formation performed in the predetermined mode, and a printing unit configured to print information on the number of pages stored in the recording medium.

13 Claims, 6 Drawing Sheets

FIG.6A

601

PAGE ACCUMULATED VALUES AND TONER CONSUMPTION AMOUNTS OF HIGH SATURATION PRINTING AND NORMAL PRINTING

| | HIGH SATURATION PRINTING | NORMAL PRINTING |
|---|---|---|
| CYAN (C) | 100 PAGE (6.8%) | 400 PAGE (3.2%) |
| MAGENTA (M) | 100 PAGE (6.8%) | 400 PAGE (3.2%) |
| YELLOW (Y) | 100 PAGE (6.8%) | 400 PAGE (3.2%) |
| BLACK (K) | 300 PAGE (13.4%) | 1200 PAGE (6.6%) |

FIG.6B

602

PAGE ACCUMULATED VALUES OF HIGH SATURATION PRINTING AND NORMAL PRINTING

| | HIGH SATURATION PRINTING | NORMAL PRINTING |
|---|---|---|
| CYAN (C) | 100 PAGE | 400 PAGE |
| MAGENTA (M) | 100 PAGE | 400 PAGE |
| YELLOW (Y) | 100 PAGE | 400 PAGE |
| BLACK (K) | 300 PAGE | 1200 PAGE |

FIG.6C

603

PAGE ACCUMULATED VALUES OF HIGH SATURATION PRINTING

| | HIGH SATURATION PRINTING |
|---|---|
| CYAN (C) | 100 PAGE |
| MAGENTA (M) | 100 PAGE |
| YELLOW (Y) | 100 PAGE |
| BLACK (K) | 300 PAGE |

IMAGE FORMING APPARATUS, CONTROL METHOD THEREOF, AND STORAGE MEDIUM

BACKGROUND

Field

The present disclosure relates to an image forming apparatus, a control method thereof, and a storage medium.

Description of the Related Art

Electrophotographic image forming apparatuses perform image formation (printing) in such a manner that an electrostatic latent image is formed on a photosensitive drum, a developing device applies toner to the photosensitive drum to develop the electrostatic latent image, and the toner is transferred from the photosensitive drum to a recording sheet or the like.

Japanese Patent Application Laid-Open No. H5-241436 discusses an image recording apparatus configured such that a rotation speed of a developing roller for supplying toner to a photosensitive drum is adjustable with respect to a rotation speed of the photosensitive drum to change density of a color to be recorded.

Japanese Patent Application Laid-Open No. 2018-054862 discusses an image forming apparatus that adjusts color appropriately by determining, based on information on a rotation speed of an image bearing member and a rotation speed of a developing device, a color conversion table to be used in transferring and recording of image data to a recording sheet.

In a case where the relative speed of the developing roller with respect to the photosensitive drum is changed to increase an amount of toner to be supplied to the photosensitive drum, a toner consumption amount increases, which shortens a life of an attached toner cartridge. However, in the conventional apparatuses, users are not able to check how much increase in a toner supply amount has been performed on the toner cartridge in printing. Thus, for example, even in a case where the life of the toner cartridge is shortened, users are not able to find out that the shortened life of the toner cartridge is due to printing performed with an increased toner supply amount.

SUMMARY

According to an aspect of the present disclosure, an image forming apparatus that performs image formation in such a manner that an electrostatic latent image is formed on a photosensitive drum, a developing device applies toner to the photosensitive drum to develop the electrostatic latent image, and the toner is transferred from the photosensitive drum to a recording material, the image forming apparatus being configured to perform the image formation by rotating the developing device in such a manner that a relative speed of the developing device with respect to the photosensitive drum is set to a first speed, the image forming apparatus includes a setting unit configured to set a predetermined mode in which the relative speed of the developing device with respect to the photosensitive drum is set to a second speed higher than the first speed, a storage unit configured to store, in a recording medium disposed in a toner cartridge containing the toner, information on a number of pages printed in the image formation performed in the predetermined mode, and a printing unit configured to print information on the number of pages stored in the recording medium.

Further features of the present disclosure will become apparent from the following description of exemplary embodiments (with reference to the attached drawings).

BRIEF DESCRIPTION OF THE DRAWINGS

FIGS. 6A to 6C are diagrams each illustrating an example of the report print of the image forming apparatus.

DESCRIPTION OF THE EMBODIMENTS

A preferred exemplary embodiment of the present disclosure will now be described with reference to the accompanying drawings.

An image forming apparatus 100 according to the present exemplary embodiment is a multifunction peripheral (MFP) that has various functions, such as a scan function, a print function, a copy function, and a transmission function, and forms an image on a recording material by an electrophotographic method. The image forming apparatus 100 is not limited to this, and can be a copying machine, a laser printer, a facsimile apparatus, or the like that forms an image on a recording material by an electrophotographic method. While the image forming apparatus 100 may be either a monochrome type or a multi-color type, the image forming apparatus 100 in the present exemplary embodiment is an MFP capable of forming a multi-color image on a recording material with developers (toners) of a plurality of colors (four colors of cyan, magenta, yellow, and black (CMYK)).

In the below description, for the sake of convenience, the recording material is a sheet of various standards, and is described as "print sheet" when the standard is not particularly limited.

Figure 1:
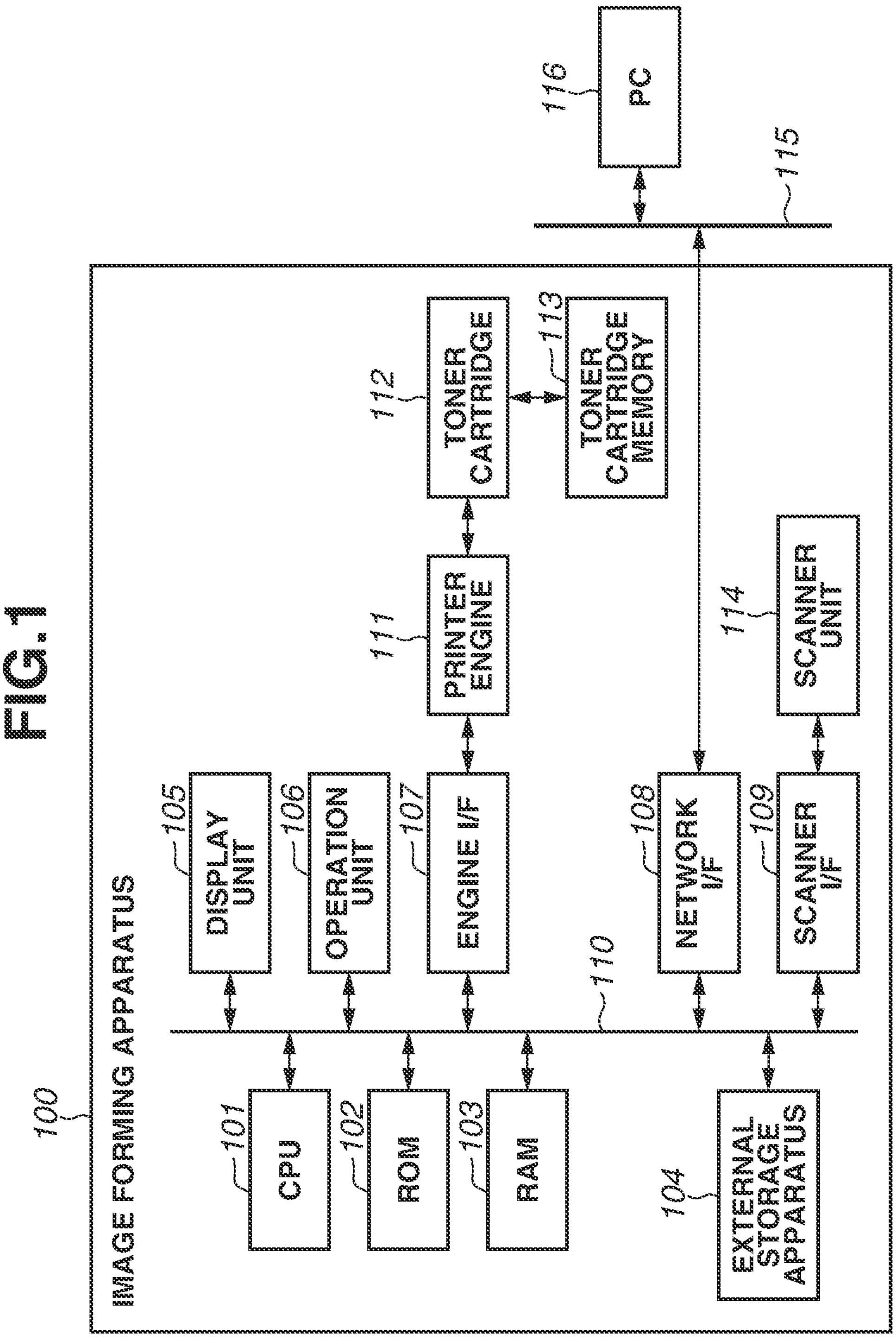
FIG. 1 is a block diagram illustrating a hardware configuration of an image forming apparatus.

FIG. 1 is a block diagram illustrating a hardware configuration of the image forming apparatus 100.

The image forming apparatus 100 includes various devices, such as a central processing unit (CPU) 101, a read-only memory (ROM) 102, a random-access memory (RAM) 103, an external storage apparatus 104, a display unit 105, an operation unit 106, an engine interface (I/F) 107, a network I/F 108, and a scanner I/F 109. The devices included in the image forming apparatus 100 are connected to each other via a system bus 110 to communicate with each other.

The image forming apparatus 100 also includes a printer engine 111 and a scanner unit 114. The printer engine 111 is connected to the system bus 110 via the engine I/F 107. The scanner unit 114 is connected to the system bus 110 via the scanner I/F 109.

The CPU 101 performs overall control of the image forming apparatus 100 by reading a program stored in the ROM 102 into the RAM 103 and executing the program to comprehensively control operation of each unit included in the image forming apparatus 100.

The ROM 102 stores a system activation program, a program for control of the printer engine 111, and character data and character code information, for example.

The RAM 103 as a volatile memory is used as a work area for the CPU 101 and a temporary storage area for various types of data. The RAM 103 is also used as a storage area in which print data received from an external apparatus is stored.

Various data is spooled to the external storage apparatus 104, and print data is also stored in the external storage apparatus 104. The external storage apparatus 104 is able to be used as a work area for the CPU 101. The external storage apparatus 104 is, for example, a recording medium, such as a hard disk drive, but is not limited thereto.

The display unit 105 displays a setting state of the image forming apparatus 100, a status of a process being executed, and an error state, for example. The display unit 105 is, for example, a liquid crystal display (LCD), but is not limited thereto.

The operation unit 106 includes hardware keys and an input device, such as a touch panel, disposed on the display unit 105, and receives an input (instruction) performed by a user operation. For example, the operation unit 106 receives inputs, such as a setting change and a reset of the image forming apparatus 100, settings of an operation mode (print mode) of the image forming apparatus 100 in execution of image formation (printing), and execution of a job.

The engine I/F 107 is an interface for controlling the printer engine 111 in response to an instruction from the CPU 101 during execution of printing, and engine control commands and the like are transmitted and received between the CPU 101 and the printer engine 111 via the engine I/F 107.

A toner cartridge 112 which is replaceable is attached to the printer engine 111. Toner is stored in the toner cartridge 112. A toner cartridge memory 113 as a recording medium is able to be attached to the toner cartridge 112. The toner cartridge memory 113 stores a page accumulated value of pages printed by the toner cartridge 112, a toner consumption amount, a toner remaining amount, and a toner total amount, for example.

The printer engine 111 is controlled by the CPU 101 and forms (prints) an image on a print sheet based on print data received via the system bus 110. The printer engine 111 includes a fixing device (fixing unit) that fixes a toner image transferred to the print sheet to the print sheet by heat. The fixing device includes a heating unit (heater) for heating the print sheet. A heater temperature (fixing temperature) in fixing the image on the print sheet is controlled by the CPU 101.

The network I/F 108 is an interface for connecting the image forming apparatus 100 to a network 115.

The network 115 is, for example, a local area network (LAN), or a Public Switched Telephone Network (PSTN). A personal computer (PC) 116 is connected to the network 115, and the PC 116 is able to transmit print data to the image forming apparatus 100 and instruct the image forming apparatus 100 to perform printing. The connection destination of the network 115 is not limited to the PC 116, and can be a server or an information processing terminal, such as a tablet or a smartphone.

The scanner unit 114 is controlled by the CPU 101, reads (a sheet surface of) a document as an image to generate print data, and transmits the print data to the RAM 103 or the external storage apparatus 104 via the scanner I/F 109.

The scanner I/F 109 is an interface that controls the scanner unit 114 in accordance with an instruction from the CPU 101 in document reading performed by the scanner unit 114. A scanner unit control command and the like are transmitted and received between the CPU 101 and the scanner unit 114 via the scanner I/F 109.

Figure 2:
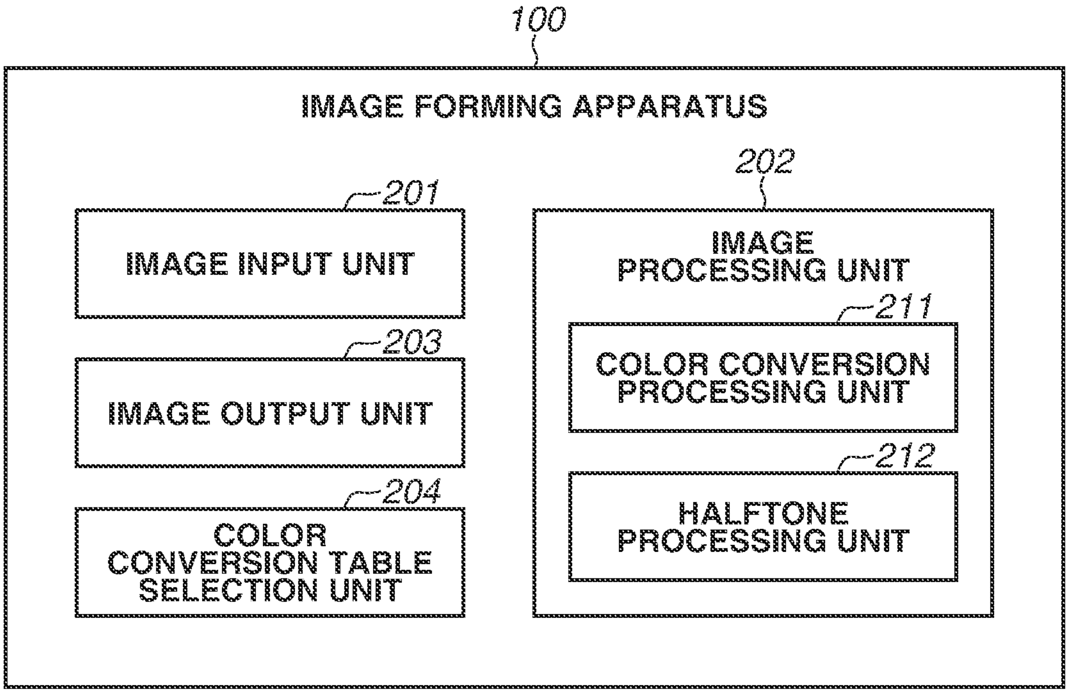
FIG. 2 is a block diagram illustrating a functional configuration of the image forming apparatus.

FIG. 2 is a block diagram illustrating a functional configuration of the image forming apparatus 100.

The image forming apparatus 100 includes an image input unit 201, an image processing unit 202, an image output unit 203, and a color conversion table selection unit 204. Each of these functional units is implemented by the CPU 101 reading out a program stored in the ROM 102 to the RAM 103 and executing the program.

The image input unit 201 receives print data input to the image forming apparatus 100 from the PC 116 or the like, and stores the received print data in the RAM 103 or the external storage apparatus 104.

The print data input to the image input unit 201 is, for example, a page description language (PDL) or a bitmap image.

The color conversion table selection unit 204 receives a setting set by a user from the operation unit 106, and obtains a ratio of circumferential speeds (circumferential speed ratio) between a developing roller 303 and a photosensitive drum 304 (see FIG. 3 described below) determined based on the received setting.

The circumferential speeds indicate rotational speeds of the developing roller 303 and the photosensitive drum 304 in rotating. The circumferential speed ratio indicates a rotation ratio between the developing roller 303 and the photosensitive drum 304 in rotating. For example, a toner application amount is able to be increased by increasing the circumferential speed ratio in such a manner that the number of rotations of the photosensitive drum 304 is reduced to one-half or one-third of that in normal printing and the number of rotations of the developing roller 303 is increased several times. The circumferential speed ratio is utilized to perform switching between the normal printing and printing in which a toner supply amount is increased to obtain a brighter output than that in the normal printing (hereinafter referred to as "high saturation printing").

The color conversion table selection unit 204 selects a lookup table (LUT) in accordance with the circumferential speed ratio from among a plurality of color conversion three dimensional LUTs for three inputs of red/green/blue (RGB) and four outputs of CMYK stored in the external storage apparatus 104 or the ROM 102. A color conversion coefficient based on the LUT is changed between the normal printing and the high saturation printing, which results in an appropriate color adjustment to be performed in accordance with each printing application.

The image processing unit 202 performs image processing, such as color conversion processing and halftone processing, on the input print data, whereby the input print data is converted into data (hereinafter referred to as "image data") corresponding to an image that is able to be output (that is able to be printed on a print sheet) by the image output unit 203. In this way, the image processing unit 202 generates image data from the input print data.

The image output unit 203 receives the image data generated by the image processing unit 202 and transmits the image data in the form of a video signal to the printer engine 111 via the engine I/F 107. The CPU 101 controls the printer engine 111 in such a manner that an image based on the image data generated by the image processing unit 202 is formed on a print sheet. The printer engine 111 executes processes of exposure, development, transfer, and fixing to print the image on the print sheet.

The image processing unit 202 will be described in detail.

As shown in FIG. 2, the image processing unit 202 includes a color conversion processing unit 211 and a halftone processing unit 212.

The color conversion processing unit 211 uses the color conversion three dimensional LUT selected by the color conversion table selection unit 204 to convert the input image data into image data supported by the printer engine 111. For example, in a case where the input image data is red/green/blue (RGB) data and printing is performed with CMYK toners, the color conversion processing unit 211 applies processing for converting the RGB data into CMYK data to the input image data.

The halftone processing unit 212 performs halftone processing on the image data that has been converted into the CMYK data by the color conversion processing unit 211. The printer engine 111 usually supports outputting of only a low gradation number, such as 2, 4, or 16 gradations. For this reason, the halftone processing unit 212 performs the halftone processing to perform outputting with stable halftone representation even when the outputting is performed with a small number of gradations. Examples of the halftone processing by the halftone processing unit 212 include various methods, such as a density pattern method, an ordered dither method, and an error diffusion method.

Because these various methods are known, the detailed descriptions will be omitted.

Figure 3:
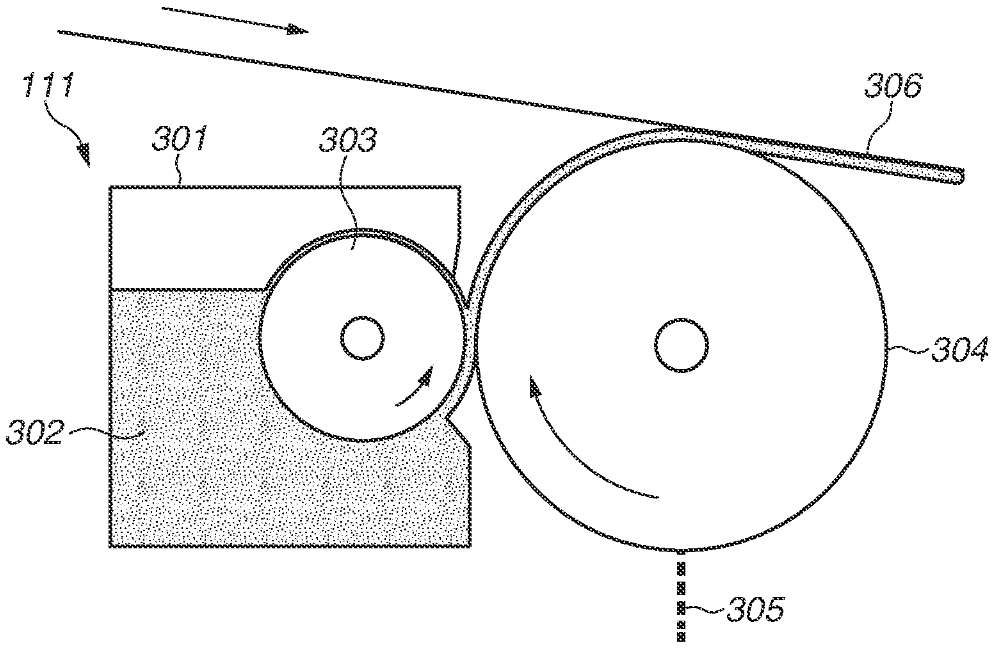
FIG. 3 is a diagram schematically illustrating a part of the image forming apparatus.

FIG. 3 is a diagram schematically illustrating a part of the printer engine 111.

The printer engine 111 includes a developing device 301 and the photosensitive drum 304. The developing device 301 and the photosensitive drum 304 are components of the printer engine 111.

An electrostatic latent image is formed on a surface of the photosensitive drum 304 by irradiation with a laser 305. The developing device 301 applies toner 302 to the developing roller 303 in a thin film form and develops the electrostatic latent image formed on the photosensitive drum 304. The photosensitive drum 304 performs printing by transferring the toner image to an intermediate transfer belt 306. Transferring of the toner image on the intermediate transfer belt 306 to a print sheet is a known configuration, and thus, the description will be omitted.

In the high saturation printing, a relative difference between the circumferential speed of the developing roller 303 and the circumferential speed of the photosensitive drum 304 is adjusted by at least one of a process of increasing the circumferential speed of the developing roller 303 and a process of decreasing the circumferential speed of the photosensitive drum 304, whereby the amount of toner to be applied to the photosensitive drum 304 is increased.

Further, irradiation intensity of the laser 305 is increased to cause the toner 302 to be easily attached to the photosensitive drum 304.

With the above described two controls, the amount of toner applied to the photosensitive drum 304 is increased, and the increased toner amount is transferred to the print sheet, whereby saturation is increased.

A normal printing mode and a high saturation printing mode (predetermined mode) are able to be set. In the normal printing mode, the relative speed of the circumferential speed of the developing roller 303 with respect to the circumferential speed of the photosensitive drum 304 is a first speed. In the high saturation printing mode, the relative speed is a second speed faster than the first speed. The normal printing and the high saturation printing are switched in accordance with the mode.

The CPU 101 receives a setting of a mode from the operation unit 106, and controls the circumferential speeds (rotation speeds) of the developing roller 303 and the photosensitive drum 304 according to the mode. For the sake of easy operability, the switching between the normal printing mode and the high saturation printing mode can be performed in accordance with a setting performed for a sheet discharge speed. In the setting for the sheet discharge speed, a mode of the high saturation printing with different density can be set. More specifically, in a case where the user sets the sheet discharge speed setting to one-half or one-third by using the operation unit 106, the CPU 101 operates the photosensitive drum 304 at one-half or one-third of a speed of the normal printing to change the discharge speed of the print sheet. For example, in the one-half setting, the developing roller 303 rotates six times while the photosensitive drum 304 rotates once, and in the one-third setting, the developing roller 303 rotates nine times while the photosensitive drum 304 rotates once. In the above described way, a change in the sheet discharge speed changes the amount of toner to be applied to the photosensitive drum 304, whereby the high saturation printing with various densities is able to be realized.

Figure 4:
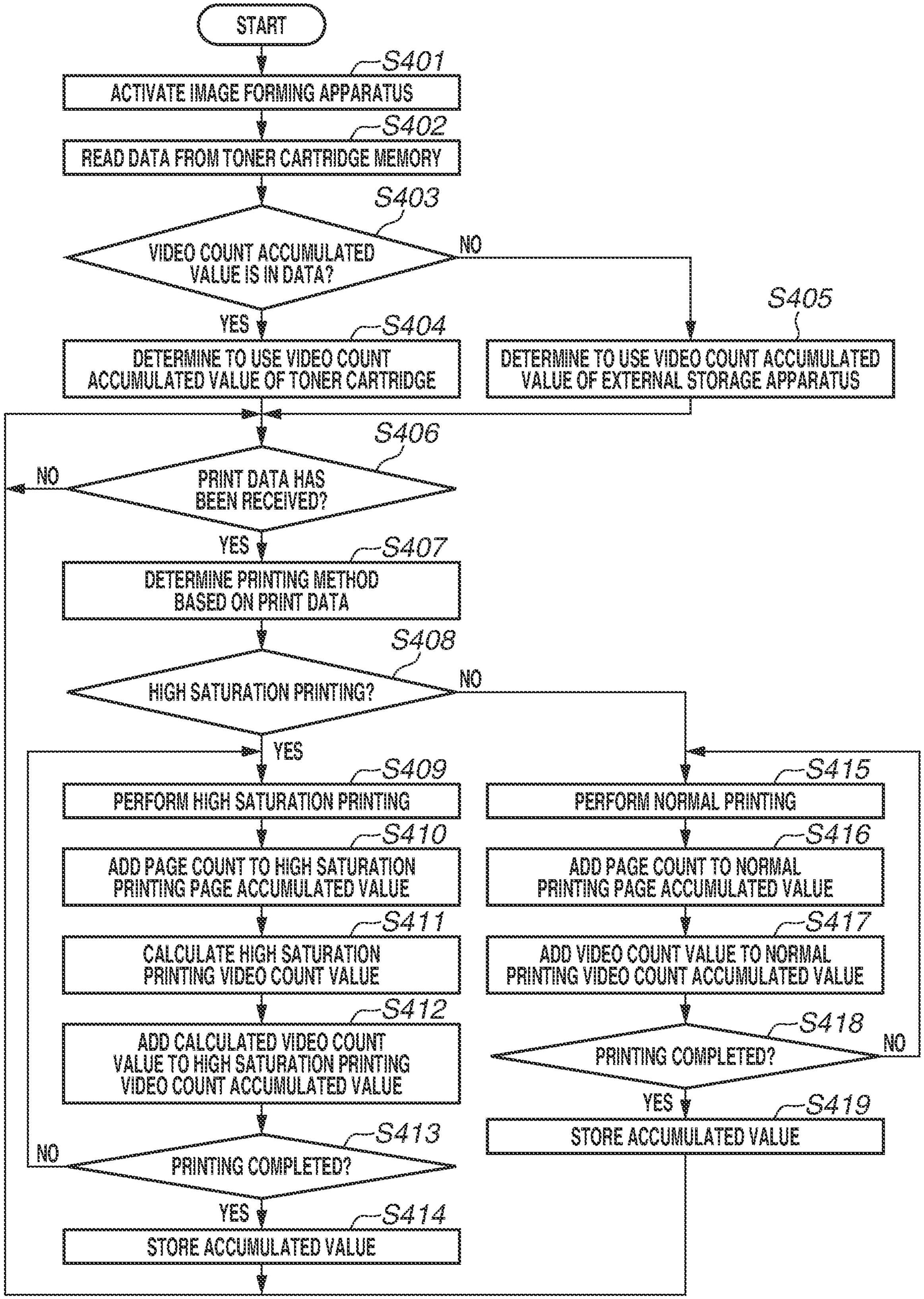
FIG. 4 is a flowchart illustrating an accumulation control process of the image forming apparatus.

FIG. 4 is a flowchart illustrating processing of accumulation control of the number of pages and a video count value in the high saturation printing and the normal printing. Each process illustrated in the flowchart of FIG. 4 is realized by the CPU 101 reading out a program stored in the ROM 102 to the RAM 103 and executing the program to integrally control the operation of each unit of the image forming apparatus 100.

In step S401, the CPU 101 activates the image forming apparatus 100.

In step S402, the CPU 101 reads data stored in the toner cartridge memory 113 attached to the toner cartridge 112.

The data contains a page accumulated value indicating the total number of pages printed in the high saturation printing and a page accumulated value indicating the total number of pages printed in the normal printing with the toner cartridge 112 currently being attached. The data may further contain a video count accumulated value of printing performed in the high saturation printing and a video count accumulated value of printing performed in the normal printing with the toner cartridge 112 currently being attached.

A video count value is obtained by accumulation of, on a toner color by toner color basis of cyan (C), magenta (M), yellow (Y), and black (K), pixel values of one page with respect to the image data, and the video count accumulated value is obtained by accumulating video count values of all printed pages.

The video count accumulated value of the high saturation printing and the video count accumulated value of the normal printing are stored separately. The video count accumulated values can be stored in both or either of the toner cartridge memory 113 and the external storage apparatus 104, or can be stored only in the external storage apparatus 104.

In step S403, the CPU 101 determines whether a video count accumulated value is in the data read from the toner cartridge memory 113. In a case where the video count accumulated value is in the data (YES in step S403), the processing proceeds to step S404. In a case where the video count accumulated value is not in the data (NO in step S403), the processing proceeds to step S405.

In step S404, the CPU 101 uses the video count accumulated value in the data as a current video count accumulated value of the toner cartridge 112 being currently attached.

More specifically, the CPU 101 performs accumulation on the video count accumulated value read in steps S412 and S417 described below. In this case, even in a case where the toner cartridge 112 that has been used (used toner cartridge) is attached, the video count accumulated value stored in the toner cartridge memory 113 is able to be continuously used, whereby the toner consumption amount is calculated based on accurate information.

On the other hand, in step S405, the CPU 101 estimates the current video count accumulated value of the toner cartridge 112 being currently attached from a total video count accumulated value stored in the external storage apparatus 104. The CPU 101 stores, in the external storage apparatus 104, the total video count accumulated value and a total page accumulated value of the high saturation printing and the total video count accumulated value and a total page accumulated value of the normal printing performed with a plurality of toner cartridges 112 attached so far. The total video count accumulated value is a video count accumulated value obtained by accumulation from the time when the image forming apparatus 100 is shipped and first activated to the current time. Further, the total page accumulated value is a page accumulated value obtained by accumulation from the time when the image forming apparatus 100 is shipped and first activated to the current time. Thus, by dividing the total video count accumulated value of the high saturation printing by the total page accumulated value of the high saturation printing, an average value of the video count values per page of the high saturation printing is calculated.

By multiplying the calculated average value by the page accumulated value of the high saturation printing stored in the toner cartridge memory 113, the current video count accumulated value of the high saturation printing with the toner cartridge 112 being currently attached is able to be calculated in a pseudo manner. Similarly, an average value of the video count values per page of the normal printing is able to be calculated by dividing the total video count accumulated value of the normal printing by the total page accumulated value of the normal printing. By multiplying the calculated average value by the page accumulated value of the normal printing stored in the toner cartridge memory 113, the current video count accumulated value of the normal printing with the toner cartridge 112 being currently attached is able to be calculated in a pseudo manner.

For example, in a case where the total video count accumulated value of cyan (C) of the high saturation printing is 200,000 pixels and the total page accumulated value is 100 pages, the average value of the video count values per page of the high saturation printing is 200,000/100=2,000 pixels. In a case where the page accumulated value of the high saturation printing stored in the toner cartridge memory 113 is 200 pages, 2,000 pixels*200 pages=400,000 pixels is an initial value of the video count accumulated value of the high saturation printing.

The video count accumulated values of the high saturation printing and the normal printing are used as initial values, and accumulation of the video count values at the time of printing after step S406 described below is repeated, whereby the video count accumulated values are able to be used as ratio data of the toner consumption amounts of the high saturation printing and the normal printing. Even in a case where the toner cartridge 112 is replaced with a toner cartridge that has been used (used toner cartridge), by the processing in step S405, the initial value of the current video count accumulated value of the toner cartridge 112 after the replacement is able to be estimated based on the video count accumulated value before the replacement. The video count accumulated values of the high saturation printing and the normal printing calculated in step S405 are calculated from the averages of printing performed by the plurality of toner cartridges 112 attached so far, and thus do not indicate accurate toner consumption amounts of the toner cartridge 112 being currently attached.

In step S406, the CPU 101 determines whether the print data has been received from the PC 116. In a case where the print data has been received from the PC 116 (YES in step S406), the processing proceeds to step S407. In a case where the print data has not been received from the PC 116 (NO in step S406), the CPU 101 waits for the print data from the PC 116.

In step S407, the CPU 101 uses the print data to determine which one of the high saturation printing and the normal printing is specified. The user selects and sets the high saturation printing mode or the normal printing mode on a user interface (UI) of a printer driver (not illustrated) in the PC 116 to perform printing.

In step S408, the CPU 101 determines whether the high saturation printing mode is set. In a case where the high saturation printing mode is set (YES in step S408), the processing proceeds to step S409. In a case where the high saturation printing mode is not set (NO in step S408), that is, in a case where the normal printing mode is set, the processing proceeds to step S415.

In step S409, the CPU 101 performs control for the high saturation printing and performs the high saturation printing.

In step S410, the CPU 101 adds the number of printed pages printed in the high saturation printing to the page accumulated value of the high saturation printing. The page accumulated value thus calculated is a page accumulated value of the high saturation printing performed with the toner cartridge 112 being currently attached.

In step S411, the CPU 101 performs calculation of the video count value of the high saturation printing.

In the high saturation printing, because the toner consumption amount increases several times with respect to the video count value of the normal printing, the video count value of the high saturation printing is calculated for each toner color by multiplying the video count value by a coefficient determined in advance.

For example, in the case of cyan (C), magenta (M), and yellow (Y), the coefficient is set to 2 in a case where the toner consumption is twice the toner consumption of the normal printing. On the other hand, for black (K), the coefficient is set to 1 in a case where the toner consumption is suppressed to avoid excessive darkening and the toner consumption is equal to the toner consumption of the normal printing.

In addition, in a case where the toner consumption amount is changed using the circumferential speeds (rotation speeds) of the developing roller 303 and the photosensitive drum 304, the coefficient can be changed in accordance with the circumferential speeds of the developing roller 303 and the photosensitive drum 304. For example, in a case where the toner is consumed twice as much as the toner consumption of the normal printing when the circumferential speed ratio is one-half, the coefficient is set to 2, and in a case where the toner is consumed 2.5 times as much as the toner consumption of the normal printing when the circumferential speed ratio is one-third, the coefficient is set to 2.5.

As described above, the CPU 101 can change the value of the coefficient in accordance with at least one of the color of the toner and the circumferential speed ratio. In a case where the color of the toner is other than black, the coefficient is desirably approximately from 1.8 to 2. In a case where the color of the toner is black, the coefficient is desirably approximately 1.

In step S412, the CPU 101 adds the calculated video count value to the video count accumulated value of the high saturation printing. The video count accumulated value thus calculated is a video count accumulated value of the high saturation printing performed with the toner cartridge 112 being currently attached.

In step S413, the CPU 101 determines whether the printing is completed. In a case where the CPU 101 determines that the printing is completed (YES in step S413), the processing proceeds to step S414. In a case where the CPU 101 determines that the printing is not completed (NO in step S413), the processing returns to step S409, and the above described control is repeated until the printing is completed.

In step S414, the CPU 101 stores the page accumulated value of the high saturation printing and the video count accumulated value of the high saturation printing in the toner cartridge memory 113. Further, the CPU 101 may also store the page accumulated value of the high saturation printing and the video count accumulated value of the high saturation printing in the external storage apparatus 104. Thus, the page accumulated value of the high saturation printing and the video count accumulated value of the high saturation printing performed with the toner cartridge 112 being currently attached are updated.

Further, the CPU 101 adds the page accumulated value of the high saturation printing calculated in step S410 to the total page accumulated value of the high saturation printing stored in the external storage apparatus 104, and stores the calculated value. Further, the CPU 101 adds the video count accumulated value calculated in step S412 to the total video count accumulated value of the high saturation printing stored in the external storage apparatus 104, and stores the calculated value. Thus, the total page accumulated value of the high saturation printing and the total video count accumulated value of the high saturation printing from when the image forming apparatus 100 has been first activated to the current time are updated.

In a case where the normal printing is set in step S408 (NO in step S408), the processing proceeds to step S415.

In step S415, the CPU 101 performs control for the normal printing and performs the normal printing.

In step S416, the CPU 101 adds the number of pages printed in the normal printing to the page accumulated value of the normal printing. The page accumulated value thus calculated is a page accumulated value of the normal printing performed with the toner cartridge 112 being currently attached.

In step S417, the CPU 101 adds the video count value of printing performed in the normal printing to the video count accumulated value of the normal printing. The video count accumulated value thus calculated is a video count accumulated value of the normal printing performed with the toner cartridge 112 being currently attached.

In step S418, the CPU 101 determines whether the printing is completed. In a case where the CPU 101 determines that the printing is completed (YES in step S418), the processing proceeds to step S419. In a case where the CPU 101 determines that the printing is not completed (NO in step S418), the processing returns to step S415, and the above described control is repeated until the printing is completed.

In step S419, the CPU 101 stores the page accumulated value of the normal printing and the video count accumulated value of the normal printing in the toner cartridge memory 113. Further, the CPU 101 may also store the page accumulated value of the normal printing and the video count accumulated value of the normal printing in the external storage apparatus 104. Thus, the page accumulated value of the normal printing and the video count accumulated value of the normal printing performed with the toner cartridge 112 being currently attached are updated.

Further, the CPU 101 adds the page accumulated value of the normal printing calculated in step S416 to the total page accumulated value of the normal printing stored in the external storage apparatus 104, and stores the calculated value. Further, the CPU 101 adds the video count accumulated value calculated in step S417 to the total video count accumulated value of the normal printing stored in the external storage apparatus 104, and stores the calculated value. Thus, the total page accumulated value of the normal printing and the total video count accumulated value of the normal printing from when the image forming apparatus 100 has been first activated to the current time are updated.

A description will be given of an example case in which (initial values of) the video count accumulated values of the high saturation printing before a start of printing are 200,000 pixels for cyan (C), 200,000 pixels for magenta (M), 200,000 pixels for yellow (Y), and 200,000 pixels for black (K).

In the high saturation printing, printing is performed with video count values of 6,000 pixels for cyan (C), 5,000 pixels for magenta (M), 4,000 pixels for yellow (Y), and 2,000 pixels for black (K) with the coefficient doubled in accordance with the circumferential speed ratio.

As a result, the video count accumulated value of cyan (C) is updated to 200,000+(6,000*2)=212,000 pixels.

The video count accumulated value of magenta (M) is updated to 200,000+(5,000*2)=210,000 pixels.

The video count accumulated value of yellow (Y) is updated to 200,000+(4,000*2)=208,000 pixels.

The video count accumulated value of black (K) is updated to 200,000+(2,000*1)=202,000 pixels.

In a case where the toner cartridge 112 is replaced, the CPU 101 deletes the page accumulated value of the high saturation printing, the video count accumulated value of the high saturation printing, the page accumulated value of the normal printing, and the video count accumulated value of the normal printing which have been stored in the external storage apparatus 104. By the deletion of the values, the page accumulated value of the high saturation printing, the video count accumulated value of the high saturation printing, the page accumulated value of the normal printing, and the video count accumulated value of the normal printing are able to be stored in the external storage apparatus 104 for a replaced toner cartridge 112.

However, the present disclosure is not limited to the case where the pieces of information are deleted when the toner cartridge 112 is replaced. For example, the page accumulated values and the video count accumulated values can be stored in the external storage apparatus 104 in association with individual identification information of the toner cartridge 112 to be replaced, to avoid deletion of the pieces of information when the toner cartridge 112 is replaced.

Figure 5:
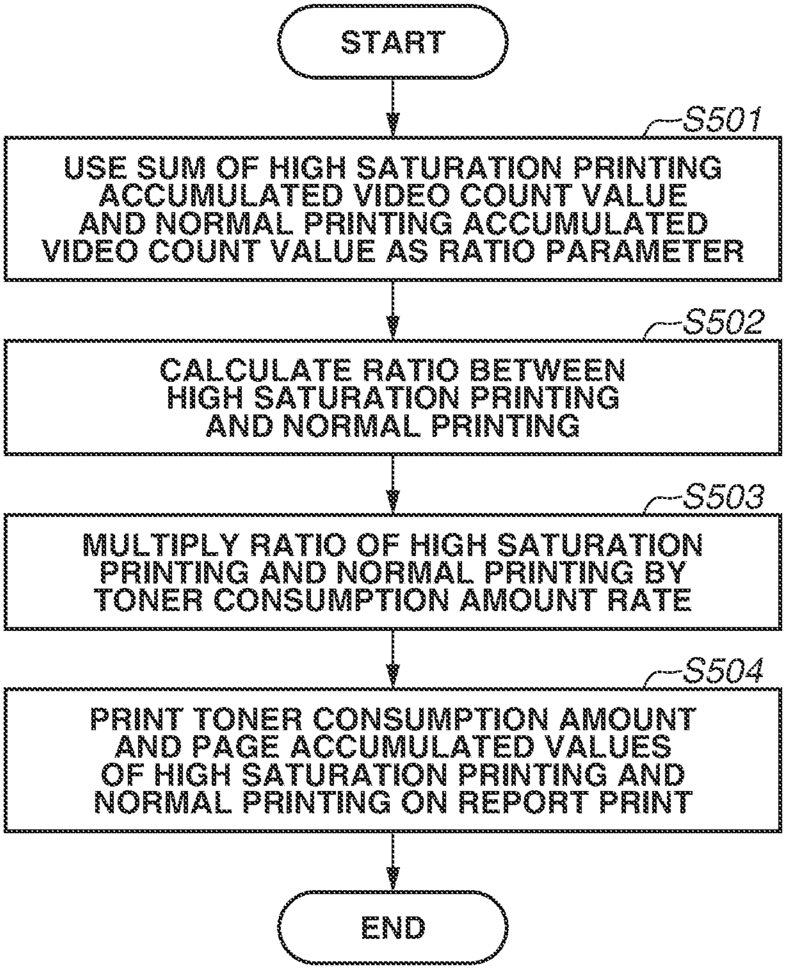
FIG. 5 is a flowchart illustrating a process of printing a report print of the image forming apparatus.

FIG. 5 is a flowchart illustrating a process in printing a report print indicating the toner consumption amount. The flowchart illustrated in FIG. 5 is started when the user issues a print execution instruction from the operation unit 106 and the CPU 101 receives the instruction.

In step S501, the CPU 101 reads the video count accumulated value of the high saturation printing and the video count accumulated value of the normal printing stored in the toner cartridge memory 113. The CPU 101 adds the read video count accumulated value of the high saturation printing and the read video count accumulated value of the normal printing together, and sets the calculation result as a value of a parameter of a ratio. In a case where the video count accumulated value of the high saturation printing and the video count accumulated value of the normal printing are stored in the external storage apparatus 104, the CPU 101 can read the values from the external storage apparatus 104.

A description will be given of an example case in which the video count accumulated values of the high saturation printing are 212,000 pixels for cyan (C), 210,000 pixels for magenta (M), 208,000 pixels for yellow (Y), and 202,000 pixels for black (K).

On the other hand, the video count accumulated values for the normal printing are 100,000 pixels for cyan (C), 100,000 pixels for magenta (M), 100,000 pixels for yellow (Y), and 100,000 pixels for black (K).

In this case, a value of a denominator is 212,000+100,000=312,000 pixels for cyan (C).

A value of a denominator is 210,000+100,000=310,000 pixels for magenta (M).

A value of a denominator is 208,000+100,000=308,000 pixels for yellow (Y).

A value of a denominator is 202,000+100,000=302,000 pixels for black (K).

In step S502, the CPU 101 calculates a ratio between the high saturation printing and the normal printing. In the present exemplary embodiment, the CPU 101 uses the video count accumulated value of the high saturation printing and the video count accumulated value of the normal printing as respective numerator values to calculate the ratio between the high saturation printing and the normal printing.

From the results of step S501, the ratio of cyan (C) in the high saturation printing is 212,000/312,000=0.68, and the ratio of cyan (C) in the normal printing is 100,000/312,000=0.32.

The ratio of magenta (M) in the high saturation printing is 210,000/310,000=0.68, and the ratio of magenta (M) in the normal printing is 100,000/310,000=0.32.

The ratio of yellow (Y) in the high saturation printing is 208,000/308,000=0.68, and the ratio of yellow (Y) in the normal printing is 100,000/308,000=0.32.

The ratio of black (K) in the high saturation printing is 202,000/302,000=0.67, and the ratio of black (K) in the normal printing is 100,000/302,000=0.33.

In step S503, the CPU 101 calculates a toner consumption amount. In the present exemplary embodiment, the CPU 101 calculates the toner consumption amount by multiplying the ratio between the high saturation printing and the normal printing calculated in step S502 by a toner consumption rate. The toner consumption rate is calculated by dividing the toner total amount stored in the toner cartridge memory 113 by the toner consumption amount. The toner consumption amount is calculated by subtracting the toner remaining amount from the toner total amount, and the toner remaining amount is detected by various sensors or calculated using the video count accumulated values of the high saturation printing and the normal printing.

For example, in a case where the toner consumption rates of cyan (C), magenta (M), and yellow (Y) are 10%, the toner consumption amount of the high saturation printing is 10*0.68=6.8%, and the toner consumption amount of the normal printing is 10*0.32=3.2%.

In a case where the toner consumption rate of black (K) is 20%, the toner consumption amount of the high saturation printing is 20*0.67=13.4%, and the toner consumption amount of the normal printing is 20*0.33=6.6%.

In step S504, the CPU 101 prints the page accumulated values and the toner consumption amounts of the high saturation printing and the normal printing on a report print (print sheet), and ends the processing of the flowchart.

FIGS. 6A to 6C are diagrams each illustrating an example of a report print in which the page accumulated values and the toner consumption amounts are printed. Specifically, a report print 601 illustrated in FIG. 6A is an example in which both the page accumulated values and the toner consumption amounts of the high saturation printing and the normal printing are indicated together on a (one) print sheet. A report print 602 illustrated in FIG. 6B is an example in which only the page accumulated values of the high saturation printing and the normal printing are indicated on a (one) print sheet. A report print 603 illustrated in FIG. 6C is an example in which only the page accumulated values of the high saturation printing is indicated.

The indication format can be fixed to any one of the report prints 601 to 603, or can be selectable by designation of any one of the report prints 601 to 603 when the user issues a printing execution instruction from the operation unit 106.

In a case where the indication format is limited to the report prints 602 and 603, the processes of steps S403 to S405, S411, S412, and S417, which are processes relating to the video count values, may be omitted from the flowchart illustrated in FIG. 4. The processes of steps S501 to S503, which are processes relating to the video count value, may also be omitted from the flowchart illustrated in FIG. 5.

The information printed on the report prints 601 to 603 illustrated in FIGS. 6A to 6C may be stored in the external storage apparatus 104, as a method other than printing, and may be retrieved to the PC 116 via the network 115.

As described above, according to the present exemplary embodiment, the information on the number of pages printed in the high saturation printing mode is stored in the toner cartridge memory 113. The user prints the information that is about the number of pages printed in the high saturation printing mode and has been stored in the toner cartridge memory 113, whereby the user is able to check that printing has been performed with an increased toner supply amount with the toner cartridge 112 being attached.

According to the present exemplary embodiment, even in a case where the user performs replacement with a used toner cartridge 112, a toner cartridge memory 113 of the replacement toner cartridge 112 stores information on the number of pages printed in the high saturation printing mode. The user prints the information on the number of pages stored in the toner cartridge memory 113 of the replacement toner cartridge 112, whereby the user is able to check that printing has been performed with an increased toner supply amount with the replacement toner cartridge 112.

Further, according to the present exemplary embodiment, the toner consumption amounts are calculated based on the ratio between the high saturation printing and the normal printing, and is printed together with the page accumulated values. Thus, the user is able to check the toner consumption amounts in the high saturation printing and the normal printing.

As described above, the user is able to check that printing has been performed with an increased toner supply amount with the toner cartridge 112 being attached, and thus in a case where the life of the toner cartridge 112 is short, it is possible to limit the frequency of performing the high saturation printing as necessary.

Other Embodiments

The present disclosure can also be realized by processing in which a program for implementing one or more functions of the above described exemplary embodiment is supplied to a system or an apparatus via a network or a recording medium, and one or more processors in a computer of the system or the apparatus read and execute the program. The present disclosure can also be realized by a circuit (for example, an application specific integrated circuit (ASIC)) that implements one or more functions.

While, in the above described exemplary embodiment, the total video count accumulated value is the video count accumulated value accumulated from the time when the image forming apparatus 100 is shipped and first activated to the current time, the present disclosure is not limited to this. For example, the total video count accumulated value can be a video count accumulated value accumulated from a previously attached toner cartridge to a currently attached toner cartridge.

While, in the above described exemplary embodiment, the total page accumulated value is the page accumulated value accumulated from the time when the image forming apparatus 100 is shipped and first activated to the current time, the present disclosure is not limited to this. For example, the total page accumulated value can be a page accumulated value accumulated from the previously attached toner cartridge to the currently attached toner cartridge.

While, in the above described exemplary embodiment, the page accumulated values and the video count accumulated values are stored in the toner cartridge memory 113, the present disclosure is not limited to this. The page accumulated values and the video count accumulated values can be stored in a drum cartridge memory instead of the toner cartridge memory 113. The user prints information that is about the number of pages printed in the high saturation printing and has been stored in the drum cartridge memory, whereby the user is able to check that printing has been performed with an increased toner supply amount with a drum cartridge being attached.

The above described various types of control described as being performed by the CPU 101 in the above described exemplary embodiment can be performed by one piece of hardware, or a plurality of pieces of hardware (for example, a plurality of processors or circuits) can share the processing to control the entire apparatus.

Although the present disclosure has been described in detail based on the preferred exemplary embodiment, the present disclosure is not limited to the specific exemplary embodiment, and various forms within the scope not departing from the gist of the present disclosure are also included in the present disclosure.

According to the present disclosure, which has been made in view of the above described issue, it is possible to check that printing has been performed with an increased toner supply amount with a toner cartridge being attached.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-159257, filed Oct. 3, 2022, which is hereby incorporated by reference herein in its entirety.

What is claimed is:

1. An image forming apparatus that performs image formation in such a manner that an electrostatic latent image is formed on a photosensitive drum, a developing device applies toner to the photosensitive drum to develop the electrostatic latent image, and the toner is transferred from the photosensitive drum to a recording material, the image forming apparatus being configured to perform the image formation by rotating the developing device in such a manner that a relative speed of the developing device with respect to the photosensitive drum is set to a first speed, the image forming apparatus comprising:

at least one memory storing programs;

at least one processor that executes the stored programs, which cause the at least one processor to:

set a predetermined mode in which the relative speed of the developing device with respect to the photosensitive drum is set to a second speed higher than the first speed, and store, in a recording medium disposed in a toner cartridge containing the toner, information on a number of pages printed in the image formation performed in the predetermined mode, and a printer engine that prints information on the number of pages stored in the recording medium, wherein a mode in which the relative speed of the developing device with respect to the photosensitive drum is the first speed is defined as a first mode, and the predetermined mode is defined as a second mode, wherein the at least one processor separately stores, in the recording medium, information on a number of pages printed in the image formation performed in the first mode and information on a number of pages printed in the image formation performed in the second mode, and wherein the at least one processor separately stores, in the recording medium disposed in the image forming apparatus, information on a first accumulated value obtained by accumulation of video count values of respective pages printed in the image formation performed in the first mode and information on a second accumulated value obtained by accumulation of video count values of respective pages printed in the image formation performed in the second mode, and the information on the first accumulated value and the information on the second accumulated value are deleted when the toner cartridge is replaced.

2. The image forming apparatus according to claim 1, wherein the printer engine prints both the number of pages printed in the image formation performed in the first mode and the information on the number of pages printed in the image formation performed in the second mode, together on a recording material.

3. The image forming apparatus according to claim 1, wherein the at least one processor separately stores, in the recording medium, information on a first accumulated value obtained by accumulation of video count values of respective pages printed in the image formation performed in the first mode and information on a second accumulated value obtained by accumulation of video count values of respective pages printed in the image formation performed in the second mode.

4. The image forming apparatus according to claim 3, wherein the at least one processor further calculates a ratio between a toner consumption amount of the image formation performed in the first mode and a toner consumption amount of the image formation performed in the second mode, based on the information on the first accumulated value and the information on the second accumulated value, and calculates the second accumulated value based on the video count values of respective pages printed in the image formation performed in the second mode that are calculated by multiplying the video count values of respective pages printed in the image formation performed in the first mode by a coefficient.

5. The image forming apparatus according to claim 4, wherein the coefficient is changed in accordance with at least one of a color of the toner and the relative speed.

6. The image forming apparatus according to claim 5, wherein the coefficient for the color of the toner being black is smaller than the coefficient for the color of the toner being other than black.

7. The image forming apparatus according to claim 6, wherein the coefficient for the color of the toner being black is approximately 1.

8. The image forming apparatus according to claim 6, wherein the coefficient for the color of the toner being other than black is approximately from 1.8 to 2.

9. The image forming apparatus according to claim 1, wherein the at least one processor separately stores, in a recording medium disposed in the image forming apparatus, information on a first accumulated value obtained by accumulation of video count values of respective pages printed in the image formation performed in the first mode and information on a second accumulated value obtained by accumulation of video count values of respective pages printed in the image formation performed in the second mode, and wherein the at least one processor further estimates, in a case where the toner cartridge is replaced with a toner cartridge that has been used, an initial value of the first accumulated value and an initial value of the second accumulated value for the replacement toner cartridge, based on information on the first accumulated value and information on the second accumulated value that have been stored in the recording medium disposed in the image forming apparatus until replacement of the toner cartridge.

10. The image forming apparatus according to claim 9, wherein the at least one processor calculates a first average value of video count values per page printed in the image formation performed in the first mode and a second average value of video count values per page printed in the image formation performed in the second mode, based on the information on the first accumulated value and the information on the second accumulated value that have been stored in the recording medium disposed in the image forming apparatus until the replacement of the toner cartridge, and wherein the at least one processor estimates the initial value of the first accumulated value and the initial value of the second accumulated value for the replacement toner cartridge by multiplying the first average value and the second average value by the number of pages printed in the image formation performed in the first mode and the number of pages printed in the image formation performed in the second mode, respectively, which have been stored in a recording medium disposed in the replacement toner cartridge.

11. The image forming apparatus according to claim 9, wherein the at least one processor stores, even after the replacement of the toner cartridge, results of accumulation obtained by adding the video count values of respective pages printed in the image formation performed in the first mode and the video count values of respective pages printed in the image formation performed in the second mode to the first accumulated value and the second accumulated value which have been stored in the recording medium disposed in the image forming apparatus.

12. A control method of an image forming apparatus that performs image formation in such a manner that an electrostatic latent image is formed on a photosensitive drum, a developing device applies toner to the photosensitive drum to develop the electrostatic latent image, and the toner is transferred from the photosensitive drum to a recording material, the image forming apparatus being configured to perform the image formation by rotating the developing device in such a manner that a relative speed of the developing device with respect to the photosensitive drum is set to a first speed, the control method comprising:

setting a predetermined mode in which the relative speed of the developing device with respect to the photosensitive drum is set to a second speed higher than the first speed;

storing, in a recording medium disposed in a toner cartridge containing the toner, information on a number of pages printed in the image formation performed in the predetermined mode; and printing information on the number of pages stored in the recording medium, wherein a mode in which the relative speed of the developing device with respect to the photosensitive drum is the first speed is defined as a first mode, and the predetermined mode is defined as a second mode, wherein the storing includes separately storing, in the recording medium, information on a number of pages printed in the image formation performed in the first mode and information on a number of pages printed in the image formation performed in the second mode, and wherein the storing further includes separately storing, in the recording medium disposed in the image forming apparatus, information on a first accumulated value obtained by accumulation of video count values of respective pages printed in the image formation performed in the first mode and information on a second accumulated value obtained by accumulation of video count values of respective pages printed in the image formation performed in the second mode, and the information on the first accumulated value and the information on the second accumulated value are deleted when the toner cartridge is replaced.

13. A non-volatile computer readable storage medium storing a computer program for executing a method of controlling an image forming apparatus that performs image formation in such a manner that an electrostatic latent image is formed on a photosensitive drum, a developing device applies toner to the photosensitive drum to develop the electrostatic latent image, and the toner is transferred from the photosensitive drum to a recording material, the image forming apparatus being configured to perform the image formation by rotating the developing device in such a manner that a relative speed of the developing device with respect to the photosensitive drum is set to a first speed, the method comprising:

setting a predetermined mode in which the relative speed of the developing device with respect to the photosensitive drum is set to a second speed higher than the first speed;

storing, in a recording medium disposed in a toner cartridge containing the toner, information on a number of pages printed in the image formation performed in the predetermined mode; and printing information on the number of pages stored in the recording, wherein a mode in which the relative speed of the developing device with respect to the photosensitive drum is the first speed is defined as a first mode, and the predetermined mode is defined as a second mode, wherein the storing includes separately storing, in the recording medium, information on a number of pages printed in the image formation performed in the first mode and information on a number of pages printed in the image formation performed in the second mode, and wherein the storing further includes separately storing, in the recording medium disposed in the image forming apparatus, information on a first accumulated value obtained by accumulation of video count values of respective pages printed in the image formation performed in the first mode and information on a second accumulated value obtained by accumulation of video count values of respective pages printed in the image formation performed in the second mode, and the information on the first accumulated value and the information on the second accumulated value are deleted when the toner cartridge is replaced.

* * * * *